United States Patent
Bantell et al.

(10) Patent No.: US 10,307,803 B2
(45) Date of Patent: Jun. 4, 2019

(54) TRANSMISSION WINDOW CLEANLINESS FOR DIRECTED ENERGY DEVICES

(71) Applicant: SPAWAR System Center Pacific, San Diego, CA (US)

(72) Inventors: Frank Joseph Bantell, Honolulu, HI (US); Nackieb M. Kamin, Kapolei, HI (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 192 days.

(21) Appl. No.: 15/215,416

(22) Filed: Jul. 20, 2016

(65) Prior Publication Data
US 2018/0021822 A1    Jan. 25, 2018

(51) Int. Cl.
| | |
|---|---|
| *B08B 17/02* | (2006.01) |
| *B08B 5/02* | (2006.01) |
| *B08B 15/04* | (2006.01) |
| *G02B 27/00* | (2006.01) |

(52) U.S. Cl.
CPC ............... *B08B 17/02* (2013.01); *B08B 5/02* (2013.01); *B08B 15/04* (2013.01); *G02B 27/0006* (2013.01)

(58) Field of Classification Search
CPC ....... G02B 27/0006; B08B 5/02; B08B 15/04; B08B 17/02; B08B 3/02; B08B 5/04
USPC ......... 134/104.2, 37, 34, 1, 198, 21, 10, 1.1, 134/104.4; 359/509, 507, 511, 513; 15/405, 345, 300.1
See application file for complete search history.

(56) References Cited

U.S. PATENT DOCUMENTS

| | | | | |
|---|---|---|---|---|
| 3,811,027 A | * | 5/1974 | Strahan ................. | B23K 9/325 219/132 |
| 3,866,398 A | * | 2/1975 | Vernon, Jr. ........... | B08B 15/007 134/1.3 |
| 3,886,344 A | * | 5/1975 | Frantzreb, Sr. ........ | B08B 15/04 219/136 |
| 4,149,062 A | * | 4/1979 | Limmer ............. | B23K 26/1423 219/121.68 |
| 4,287,405 A | * | 9/1981 | Ohmae ................. | B08B 15/04 15/319 |
| 4,434,349 A | * | 2/1984 | Tsutsumi ............... | B08B 15/04 219/121.39 |

(Continued)

FOREIGN PATENT DOCUMENTS

| | | |
|---|---|---|
| WO | WO/2014/074947 A2 | 5/2014 |
| WO | WO/2014/074947 A9 | 8/2014 |

*Primary Examiner* — David G Cormier
*Assistant Examiner* — Thomas Bucci
(74) *Attorney, Agent, or Firm* — NIWC Pacific; Kyle Eppele; J. Eric Anderson (57) ABSTRACT

A system and method are disclosed for cleanliness of transmission windows for directed energy devices. A positive pressure gas chamber is fixed to the transmission window of a directed energy device, e.g., a laser or high power microwave. A gas source is connected to the positive pressure chamber in order to provide pressurized gas. The gas flows into the positive pressure chamber, and exits the positive pressure chamber through openings, thus pushing particulates out of the positive pressure chamber. The gas continues to flow during directed energy use, thus preventing undesirable material, e.g., dirt and moisture, from depositing on the transmission window.

9 Claims, 5 Drawing Sheets

(56) References Cited

U.S. PATENT DOCUMENTS

| | | | | |
|---|---|---|---|---|
| 4,555,613 A * | 11/1985 | Shulman | B23K 9/0956 219/124.34 |
| 4,599,506 A * | 7/1986 | Burke | B23K 9/095 219/124.34 |
| 4,609,804 A * | 9/1986 | Kishi | B23K 9/291 219/136 |
| 4,652,133 A * | 3/1987 | Antoszewski | B25J 9/1684 219/124.34 |
| 4,699,274 A | 10/1987 | Saika | |
| 4,719,914 A * | 1/1988 | Johnson | A61B 18/082 604/35 |
| 4,774,392 A * | 9/1988 | Orita | B08B 15/04 219/121.63 |
| 4,784,491 A * | 11/1988 | Penney | B23K 9/32 356/606 |
| 4,850,352 A * | 7/1989 | Johnson | A61B 18/082 606/13 |
| 4,859,829 A * | 8/1989 | Dufour | B23K 9/0956 219/124.34 |
| 4,942,284 A * | 7/1990 | Etcheparre | B08B 15/04 219/121.67 |
| 4,978,371 A * | 12/1990 | Smyrloglou | B01D 63/024 361/229 |
| 5,034,592 A * | 7/1991 | Chun | B08B 17/02 219/121.67 |
| 5,046,797 A * | 9/1991 | Kurisu | G02B 27/0006 359/217.1 |
| 5,075,534 A * | 12/1991 | Torii | B23K 9/0956 219/130.01 |
| 5,146,244 A * | 9/1992 | Myhre | B08B 17/02 356/43 |
| 5,206,698 A * | 4/1993 | Werner | G01S 7/499 356/5.05 |
| 5,220,149 A * | 6/1993 | Neidhardt | B23K 26/123 219/121.67 |
| 5,242,474 A * | 9/1993 | Herbst | A61B 18/00 417/42 |
| 5,264,678 A * | 11/1993 | Powell | B23K 9/1274 219/124.34 |
| 5,359,176 A * | 10/1994 | Balliet, Jr. | B23K 26/1476 219/121.67 |
| 5,432,601 A * | 7/1995 | Tanaka | G01N 15/0205 250/574 |
| 5,442,155 A * | 8/1995 | Nihei | B23K 9/0956 219/124.34 |
| 5,453,132 A * | 9/1995 | Kowalchuk | B08B 5/02 134/21 |
| 5,486,676 A * | 1/1996 | Aleshin | B23K 26/144 219/121.63 |
| 5,556,560 A * | 9/1996 | Ahola | B23K 9/18 219/121.45 |
| 5,561,515 A * | 10/1996 | Hairston | G01P 5/22 356/28 |
| 5,597,385 A * | 1/1997 | Moerke | A61B 18/00 55/357 |
| 5,768,740 A * | 6/1998 | McBride | A47L 7/0052 15/301 |
| 5,811,055 A * | 9/1998 | Geiger | B23K 9/0061 266/48 |
| 5,844,201 A * | 12/1998 | Dibacco | B23K 9/29 219/137.43 |
| 5,898,261 A | 4/1999 | Barker | |
| 5,898,522 A * | 4/1999 | Herpst | G02B 7/007 359/511 |
| 5,977,515 A * | 11/1999 | Uraki | B23K 26/067 219/121.84 |
| 5,981,901 A * | 11/1999 | La Rocca | B23K 26/123 219/121.63 |
| 6,019,599 A * | 2/2000 | Volcker | B08B 15/04 433/29 |
| 6,249,932 B1 * | 6/2001 | Chu | A47L 9/08 15/345 |
| 6,252,648 B1 * | 6/2001 | Hase | G02B 27/0006 355/53 |
| 6,270,222 B1 * | 8/2001 | Herpst | G02B 27/0006 359/511 |
| 6,281,472 B1 * | 8/2001 | Faerber | B23K 35/383 219/121.64 |
| 6,288,769 B1 * | 9/2001 | Akagawa | G02B 27/0006 355/30 |
| 6,306,246 B1 * | 10/2001 | Melvin | G02B 27/0006 156/345.25 |
| 6,407,803 B1 * | 6/2002 | Schrank | G01F 23/292 356/4.01 |
| 6,421,127 B1 * | 7/2002 | McAndrew | G01J 3/0259 356/437 |
| 6,476,911 B1 * | 11/2002 | Rose | G01N 15/0205 356/337 |
| 6,494,965 B1 * | 12/2002 | Walker | B08B 5/02 134/104.2 |
| 6,497,000 B1 * | 12/2002 | Russell | B08B 5/02 15/304 |
| 6,507,000 B2 * | 1/2003 | Otsubo | B23K 26/1462 219/121.7 |
| 6,555,779 B1 * | 4/2003 | Obana | B23K 9/0061 219/121.63 |
| 6,672,725 B1 * | 1/2004 | VanOsdol | G02B 27/0006 359/509 |
| 6,946,618 B2 * | 9/2005 | Tamura | B23K 26/02 219/121.63 |
| 7,138,640 B1 * | 11/2006 | Delgado | G01N 21/15 250/372 |
| 7,456,370 B2 * | 11/2008 | Beeson | B23K 26/0884 219/121.63 |
| 7,557,326 B2 * | 7/2009 | Boillot | B23K 26/032 219/121.63 |
| 7,625,277 B2 * | 12/2009 | Palmer | A61L 9/20 454/255 |
| 7,626,763 B2 * | 12/2009 | Harrison | F16P 1/02 160/229.1 |
| 7,970,040 B1 | 6/2011 | Sprangle et al. | |
| 8,053,701 B2 * | 11/2011 | Will | B23K 26/12 219/121.63 |
| 8,097,825 B2 * | 1/2012 | Sato | B23K 26/103 219/64 |
| 8,485,874 B2 | 7/2013 | Palmer | |
| 8,649,412 B2 | 2/2014 | Campbell | |
| 8,665,923 B2 | 3/2014 | Sprangle et al. | |
| 8,701,511 B2 * | 4/2014 | Oldrey | G02B 21/34 73/864.91 |
| 8,895,893 B2 * | 11/2014 | Perret | B22F 3/1055 219/121.85 |
| 9,059,561 B2 | 6/2015 | Campbell | |
| 9,089,928 B2 * | 7/2015 | Zediker | E21B 29/02 |
| 9,321,131 B2 * | 4/2016 | Lefebvre | B23K 26/08 |
| 9,981,293 B2 * | 5/2018 | Smits | H01J 37/02 |
| 2002/0040634 A1 | 4/2002 | Pinkus et al. | |
| 2002/0102065 A1 * | 8/2002 | Kiani | B08B 3/02 385/75 |
| 2003/0197909 A1 * | 10/2003 | Beyer | B08B 15/04 359/509 |
| 2003/0214599 A1 * | 11/2003 | Ito | B08B 7/02 348/335 |
| 2004/0013370 A1 * | 1/2004 | Gerhard | B08B 3/02 385/85 |
| 2004/0018803 A1 * | 1/2004 | Boumerzoug | B08B 5/02 451/39 |
| 2004/0195223 A1 * | 10/2004 | Sekiya | B08B 15/04 219/121.84 |
| 2005/0274898 A1 * | 12/2005 | Watanabe | G02B 27/0006 250/372 |
| 2005/0275738 A1 * | 12/2005 | Arai | B08B 5/02 348/335 |
| 2005/0286852 A1 * | 12/2005 | Juergen | B08B 3/02 385/134 |
| 2006/0081562 A1 * | 4/2006 | Causte | B23K 9/16 219/75 |

(56) References Cited

U.S. PATENT DOCUMENTS

| | | | |
|---|---|---|---|
| 2006/0192968 A1* | 8/2006 | Farrant | G01N 21/15 356/445 |
| 2006/0285091 A1* | 12/2006 | Parekh | G03F 7/70933 355/30 |
| 2007/0051710 A1* | 3/2007 | Odanaka | B08B 15/04 219/121.84 |
| 2007/0163715 A1* | 7/2007 | Rastegar | B08B 3/024 156/345.5 |
| 2007/0240278 A1* | 10/2007 | MacDonald | B08B 5/02 15/405 |
| 2007/0297466 A1* | 12/2007 | Ghorbani | G02B 27/0006 372/22 |
| 2008/0135182 A1* | 6/2008 | Nishikawa | B08B 5/02 156/536 |
| 2008/0144151 A1* | 6/2008 | Shibayama | G02B 6/4201 359/204.1 |
| 2008/0219866 A1 | 9/2008 | Kwong et al. | |
| 2008/0236629 A1* | 10/2008 | Sugawara | B08B 5/02 134/22.11 |
| 2008/0267816 A1* | 10/2008 | Ueno | B08B 17/02 422/24 |
| 2009/0120917 A1* | 5/2009 | Koch | B23K 26/12 219/121.78 |
| 2009/0207494 A1* | 8/2009 | Gelbart | A61B 1/126 359/509 |
| 2009/0223944 A1* | 9/2009 | Sukhman | B08B 7/0042 219/121.84 |
| 2010/0307535 A1* | 12/2010 | Fuchigami | B23K 3/08 134/18 |
| 2011/0073142 A1* | 3/2011 | Hattori | B60S 1/0848 134/56 R |
| 2011/0089151 A1* | 4/2011 | Miyagi | B23K 26/147 219/121.66 |
| 2012/0030901 A1* | 2/2012 | Manninen | B08B 5/02 15/405 |
| 2012/0033218 A1* | 2/2012 | Hokamura | F16K 3/0254 356/432 |
| 2012/0061230 A1* | 3/2012 | Schubert | B08B 15/04 204/157.3 |
| 2012/0076881 A1* | 3/2012 | Champonnois | B08B 7/0042 425/174 |
| 2012/0145683 A1* | 6/2012 | Miyagi | B23K 26/147 219/121.64 |
| 2012/0170599 A1 | 7/2012 | Sprangle et al. | |
| 2013/0003772 A1 | 1/2013 | Campbell | |
| 2013/0062228 A1* | 3/2013 | Danilov | G02B 27/0006 206/216 |
| 2013/0250403 A1 | 9/2013 | Maeda | |
| 2013/0291951 A1* | 11/2013 | Carman | G05D 7/0617 137/10 |
| 2013/0293881 A1* | 11/2013 | Tokhtuev | G01N 21/15 356/246 |
| 2013/0313238 A1* | 11/2013 | Twisselmann | B08B 5/04 219/121.84 |
| 2013/0313423 A1* | 11/2013 | Umstadter | H05G 2/003 250/282 |
| 2013/0334111 A1* | 12/2013 | Adam | G01J 1/0411 210/85 |
| 2014/0007371 A1* | 1/2014 | Lu | B08B 5/02 15/339 |
| 2014/0086271 A1 | 3/2014 | Campbell | |
| 2014/0163717 A1 | 6/2014 | Das et al. | |
| 2014/0204461 A1* | 7/2014 | Imai | G01J 3/0291 359/513 |
| 2014/0299902 A1 | 10/2014 | Zimmerman et al. | |
| 2014/0306115 A1* | 10/2014 | Kuritsyn | G02B 27/0006 250/358.1 |
| 2015/0044956 A1* | 2/2015 | Hacker | B08B 15/04 454/49 |
| 2015/0108185 A1 | 4/2015 | Polytaridis et al. | |
| 2015/0122787 A1* | 5/2015 | Patton, Jr. | B23K 9/322 219/124.4 |
| 2015/0293351 A1* | 10/2015 | Boillot | G02B 27/0006 359/509 |
| 2015/0366097 A1 | 12/2015 | Cao et al. | |
| 2016/0082485 A1* | 3/2016 | Shiroko | B05B 12/122 15/319 |
| 2016/0375521 A1* | 12/2016 | Sasaki | B23K 26/1476 219/121.17 |
| 2017/0136576 A1* | 5/2017 | Ashihara | B23K 26/1476 |

* cited by examiner

TRANSMISSION WINDOW CLEANLINESS FOR DIRECTED ENERGY DEVICES

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102474.

BACKGROUND OF THE INVENTION

Field of Invention

This disclosure relates to transmission window cleanliness, and more particularly, to transmission window cleanliness for directed energy devices.

Directed energy devices, such as optical lasers, infrared lasers and high power microwave devices, are regularly used with transmission windows. Directed energy devices emit directed energy through transmission windows to targets or specimens. In the maritime or high particulate environments, the transmission windows of these directed energy devices may collect dirt and moisture, e.g., sea spray and rain. The dirt and moisture may result in degraded performance and, may eventually result in failure of these directed energy systems that are used in maritime or high particulate environments.

Various systems and methods have been used to clean transmission windows. At one end of the spectrum, window cleanliness systems and methods have been used for very controlled environments, mostly within laboratory environment settings. In controlled environments, care is taken so that the window does not become dirty in the first place. At the other end of the spectrum, outside of controlled environments—such as in maritime or high particulate environments—transmission windows may become dirty due to the dirt and moisture that collect on them. Historically, simple manual cleanings of the transmission windows may have occurred between uses of the directed energy system. However, the manual cleaning method may interfere with use of the directed energy device, as the directed energy device cannot be fired while the operator is manually wiping the window. Moreover, the operator may be unable to maintain the desired level of cleanliness of the transmission window since dirt and moisture may continue to collect on the transmission window between cleanings, including during firing of the directed energy device.

Various methods have been used to clean windows in general. For example, prior art methods for cleaning windows in general include the use of solvents. However, when transmission windows are used in conjunction with directed energy devices, solvents may interfere with the directed energy and the desired level of transmission through the window may not occur. For example, the directed energy may interact with the solvent and warm up, potentially ruining the transmission window. Therefore, using solvents may not be feasible with directed energy devices.

Other options for maintaining window cleanliness include adjusting the type of material in the window to make particulates less likely to deposit in the window. For example, a physical nano-coating may be placed over the surface of the window. LIQUIPEL® is an example of such a physical coating. The physical coating may be similar to coatings used to cover cell phone screens.

However, physical coatings may not be feasible for use with transmission windows that are associated with directed energy devices. These coatings may be subject to degradation such that they detach from the transmission window. The transmission window could then become dirty, which could result in failure of the entire directed energy system.

BRIEF SUMMARY OF DISCLOSURE

The present disclosure addresses the needs noted above by providing a system and method for transmission window cleanliness for directed energy devices. In accordance with one embodiment of the present disclosure, a system and method are provided for transmission window cleanliness for directed energy devices. The system comprises a positive pressure chamber adapted to receive gas from a gas source, the positive pressure chamber being configured to receive directed energy from a directed energy device. One end of the positive pressure chamber is formed by a transmission window of the directed energy device. An exit aperture is located on an opposite end of the positive pressure chamber from the transmission window that opens to allow the directed energy and the gas to exit the positive pressure chamber when the directed energy device is firing. The system may further comprise one or more turbulence generators disposed within the positive pressure chamber, the turbulence generators being configured to receive the gas, and to cause the flow rate of the received gas to increase, wherein each turbulence generator includes a fin that is disposed on the interior wall of the positive pressure chamber. These, as well as other objects, features and benefits will now become clear from a review of the following detailed description, the illustrative embodiments, and the accompanying drawings.

DETAILED DESCRIPTION OF THE DISCLOSURE

A system and method are described herein for transmission window cleanliness for directed energy devices. Directed energy devices—specifically high energy laser (e.g., optical and infrared) and high power microwave systems—may require a transmission window through which the directed energy is emitted. The invention includes a positive pressure chamber that is attached to the transmission window. When a directed energy device is fired toward a target or specimen, the directed energy first passes through this positive pressure chamber. A gas source is also connected to the positive pressure chamber and the gas is agitated in order to create a more turbulent gas flow. Particulates in the gas are caught up in the gas flow, and ejected from the positive pressure chamber through an exit aperture and one or more openings. Thereafter, the ejected particulates and gas are separated. The separated particulates may be collected. The separated gas may optionally be recycled and sent back to the gas source for re-use.

If particulates are permitted to collect on a transmission window, consequences result. In a maritime or a high particulate environment, the transmission window may collect dirt and moisture which may result in degraded performance of the directed energy device. Particulates are solid or liquid matter that may be found in the air. Particulates can arise from a number of sources. Particulates are generally extremely small, e.g., on the order of 2.5 um. Dust, soot, sea spray, salt deposits and rain are examples of particulates. The collection of such particulates on the transmission window of the directed energy device may eventually result in failure of the entire directed energy system. When such particulates collect on the transmission window, the particulates may absorb the directed energy from the directed energy device and become very hot. At this point the particulates could either melt the transmission window, or the particulates could prevent or block the directed energy from the directed energy device from reaching the intended target.

The present system and method may be used to maintain transmission window cleanliness when a directed energy device is in use. The system and method described herein aid in eliminating or reducing the particulates that may collect on the transmission window of the directed energy device. Prior to use of the directed energy device, an operator for the directed energy device may prepare to fire the directed energy device. Preparatory steps may include the determination by the operator, via manual inspection, as to whether the system is ready to be fired and that the transmission window is clean. The transmission window may be ruined if energy is transmitted there through when the window has collected dirt and/or moisture or other particulates. The operator may also want to make sure he/she will not hit something behind a target.

Figure 1:
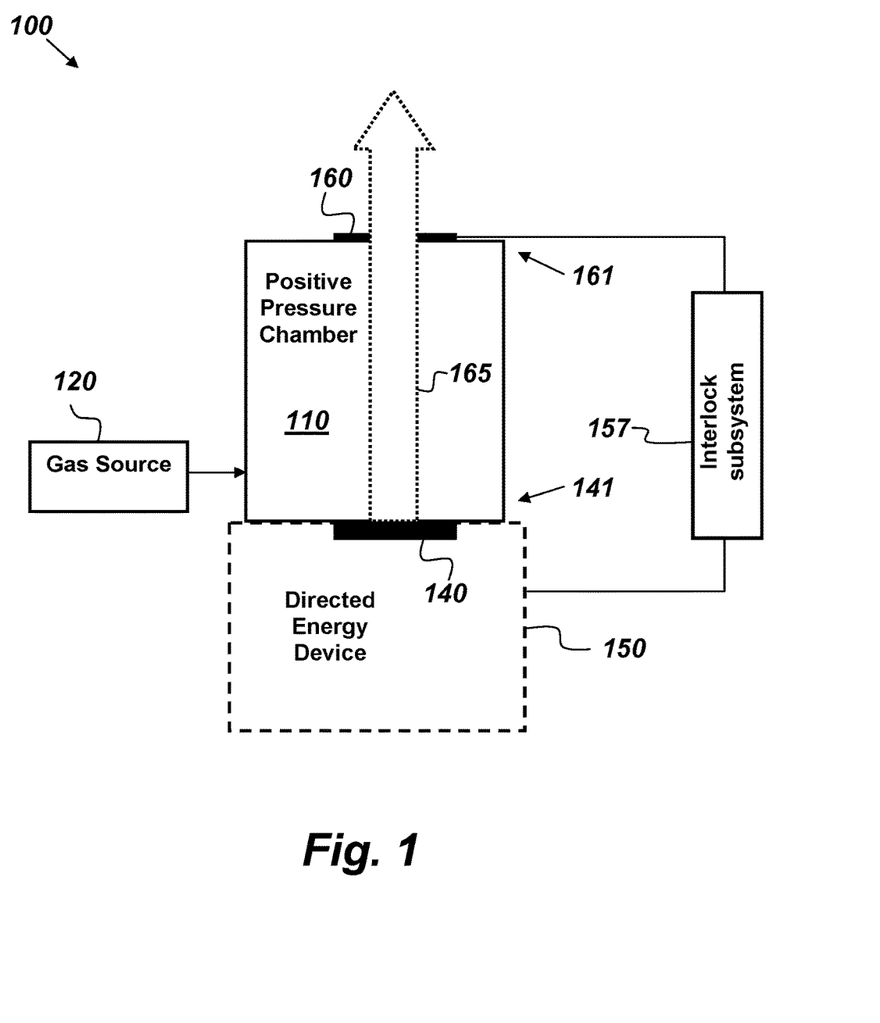
FIG. 1 is an illustration of a system for directed energy transmission window cleanliness, in accordance with one embodiment of the present disclosure.

Referring now to FIG. 1, illustrated is a side elevation view of a system for transmission window cleanliness in accordance with the embodiment of the present disclosure. As shown in FIG. 1, included within the system 100 is a positive pressure chamber 110, which is airtight when closed. The positive pressure chamber 110 is adapted to receive gas from a gas source 120 that is connected to a wall of the positive pressure chamber 110. The type of gas used may be dependent upon the type of directed energy used. Some forms of directed energy may perform well with filtered, regular air that has very low moisture or humidity. Other directed energy might perform better with a different type of gas, such as strict nitrogen.

The system and method of the present disclosure incorporate a gas source 120 that may provide gas to the positive pressure chamber 110 to aid in maintaining cleanliness of the transmission window 140 of the directed energy device 150. Gas source 120 may constantly provide gas to the positive pressure chamber when the system 100 is in use. The transmission window 140 is disposed at a proximal end 141 of the positive pressure chamber 110. The exit aperture 160 is disposed at a distal end 161 of the positive pressure chamber 110 such that free-space directed energy, represented by dashed arrow 165, entering the positive pressure chamber 110 through the transmission window 140 exits the positive pressure chamber 110 through the exit aperture 160. Also shown in FIG. 1 is an interlock subsystem 157 that is in communication with the directed energy device 150 and operatively coupled to the exit aperture 160. The interlock subsystem 157 is configured to open the exit aperture 160 such that gas in the positive pressure chamber 110 is allowed to exit the positive pressure chamber 110 when the directed energy device 150 is being fired.

Figure 2:
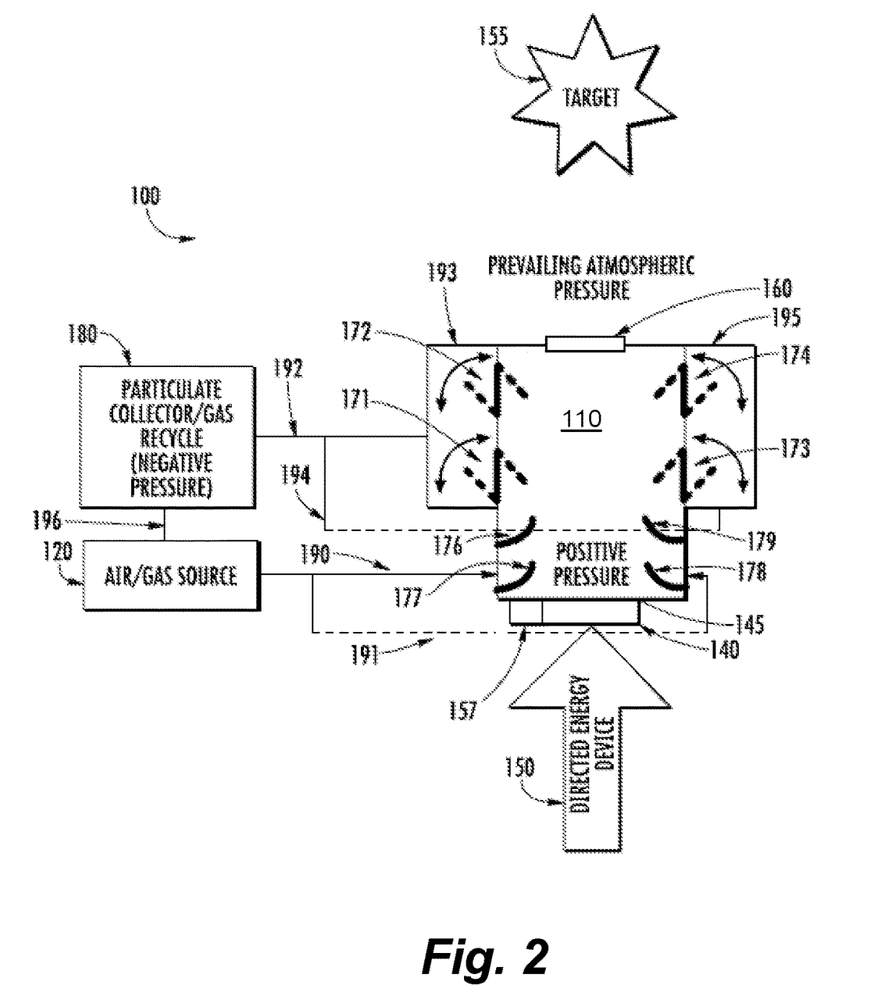
FIG. 2 is an illustration of a system for directed energy transmission window cleanliness, in accordance with one embodiment of the present disclosure.

FIG. 2 shows another embodiment of the system 100. In FIG. 2, the system 100 further includes disconnect devices 145, which may be quick disconnect devices, which may be used to selectively hold or disengage the positive pressure chamber 110 to the directed energy device 150. When the positive pressure chamber 110 is disconnected from the directed energy device 150 one has access to the transmission window 140 and also to the interior of the positive pressure chamber 110 in order to permit cleaning of the positive pressure chamber 110 and/or the transmission window.

The pressurized gas from gas source 120 can be filtered/purified. The pressurized gas from gas source 120 can also be inert. The pressurized gas can be transparent to the wavelength of the directed energy in order to provide for minimal scattering. In some cases, it may be desirable to select air as the gas. It may be desirable for that air to have the same transmission medium as the directed energy device 150. In other cases, it may be desirable to select a gas based on the acceptable minimum absorption of emissions for the directed energy device 150 that is used. It may not be desirable to use a pressurized gas that absorbs energy efficiently at the same wavelength as the emission wavelength of the directed energy device 150, as this may cause the directed energy to be absorbed in the positive pressure chamber 110 as opposed to making it to the target 155, such as is depicted in FIG. 2. The gas may be sufficient in quantity to allow repeated use such as in a maritime environment where resupplying the gas may be problematic. If the gas used is not filtered air, then the gas used may be recycled and cleaned. If the gas used is something other than air, then it may be desirable to reuse it to reduce the refilling frequency of gas storage containers such as gas cylinders.

The directed energy device 150 may emit any type of directed energy, which is generally high-powered. Examples of directed energy that may be emitted by the directed energy device 150 include a high energy laser beam (optical or infrared), a high power microwave beam and a high power X-ray beam. The directed energy may be maintained in a vacuum in the directed energy device 150 prior to transmission through the transmission window 140. Transmission window 140 may be small, e.g., on the order of one inch or a few inches or any other size suitable for the directed energy device 150 that transmits directed energy through the transmission window 140. As an alternative to the disconnect devices 145, the positive pressure chamber 110 may be fixed to the directed energy device 150 using any suitable fixing means, including, for example, screws and bolts. The directed energy in the directed energy device 150 may be maintained in a vacuum. The directed energy device 150 may be directed to a target 155.

In one embodiment, the positive pressure chamber 110 is an airtight cylinder that is interlocked with the directed energy firing signal. The interlocking action may be accomplished using commercial off-the-shelf devices. The interlock subsystem 157 determines or senses when the directed energy device 150 is being fired or engaged. This interlocking action triggers opening of exit aperture 160, and an increase in air flow/pressure within the positive pressure chamber 110 so that there is positive pressure within the positive pressure chamber 110. The interlock system could trigger or cause an increase in air flow/pressure through one or more of software logic, a pressure sensor, a mechanical sensor or other suitable means. If the interlock subsystem 157 includes software, the software may be comprised of logic that senses and/or determines when the directed energy device 150 is fired or engaged. The software may cause the exit aperture 160 to open so that the free-space directed energy 165 from the directed energy device 150 does not impact or burn the exit aperture 160 after going through the transmission window 140.

The interlock subsystem 157 may also be connected to the gas source 120. The gas source 120 may have a regulator that maintains a certain pressure inside the positive pressure chamber 110. The embodiment of the system 100 depicted in FIG. 2 comprises a set of louvers 171, 172, 173, 174, which are configured to open to eject particulates. When the louvers 171, 172, 173, 174 are open the gas source 120 may be configured to provide gas through the regulator to try and maintain a particular pressure that is higher than atmospheric pressure in order to enable the particulates to flow out of the positive pressure chamber 110. This interlocking action may be accomplished by a mechanical device and/or software that may be coupled to the flow of the directed energy to the transmission window 140.

The exit aperture 160 and the louvers 171, 172, 173, 174 may be any closeable aperture capable of creating an airtight seal when closed. For example, the exit aperture 160 may be a set of flaps that meet in the center of the exit aperture 160. It is preferable that the exit aperture 160 and the louvers 171, 172, 173, 174 be "fast" acting where fast would be defined and refined through the system design based on pressure, volumetric flow and timing with firing the directed energy. An actuator (e.g., mechanical, electrical, hydraulic, etc.) may be used to cause the substantially contemporaneous opening of exit aperture 160, and louvers 171, 172, 173, 174 with the firing of the directed energy device 150. Air pressure may also be used to cause this contemporaneous opening of exit aperture 160, and louvers 171, 172, 173, 174 with the firing of the directed energy device 150. In some situations, it may be desirable to close the exit aperture 160, and then to leave the louvers 171, 172, 173, 174 open for a short period of time to ensure that any particulate that has come into the positive pressure chamber 110 during firing of the directed energy is removed. In this case, the exit aperture 160 may have one interlock system, and louvers 171, 172, 173, 174 may have a different interlock system associated with it. Exit aperture 160 and louvers 171, 172, 173, 174 may open quickly when the directed energy device 150 is being fired. The exit aperture 160 could include doors, or other structure designed to open and close. Exit aperture 160 closes quickly and substantially contemporaneously with the cease-fire of the directed energy device 150 in order to maintain a pressure boundary. This quick closing of exit aperture 160 aids in ensuring that particulates outside the exit aperture 160 do not get sucked in when the exit aperture 160 is open. The positive pressure chamber 110 may be maintained at such a pressure that when the exit aperture 160 opens, particulates do not get sucked in. When exit aperture 160 closes it may be desirable to also close louvers 171, 172, 173, 174.

Pressure may be kept high within positive pressure chamber 110 by continuously allowing the gas source 120 to feed into the positive pressure chamber 110. This positive pressure is maintained within the positive pressure chamber 110 when the directed energy device 150 is being fired. This positive pressure also aids in keeping particulates outside of the positive pressure chamber 110 when the directed energy device is being fired. That positive pressure is kept high by physically allowing the gas from the gas source 120 to continue to feed into the positive pressure chamber 110.

The pressure outside the positive pressure chamber 110 near exit aperture 160 is the prevailing atmospheric pressure, in contrast to the positive pressure inside positive pressure chamber 110. In different environments, such as outer space, there might be a much different prevailing atmospheric pressure, which significantly impacts the amount of positive pressure needed to maintain transmission window cleanliness. In a more typical implementation, the positive pressure may be adjusted lower to maintain a desired flow rate given the expected particulate size and volume of particulates. In other words, the pressure in positive pressure chamber 110 may be tuned to the atmosphere in which the present system and method are being used.

In the embodiment of system 100 depicted in FIG. 2, one part of each of louvers 171, 172, 173, 174 would open inwardly, while the other part would open outwardly. In lieu of louvers 171, 172, 173, 174 doors or other instrumentalities that cause openings in positive pressure chamber 110 may be used.

Multiple louvers 171, 172, 173, 174 may be employed to accommodate the expected size and expected number of particulates, and to accommodate the size of the positive pressure chamber 110. In the embodiment of FIG. 2, louvers 171, 172, 173, 174 are disposed on two sides of the positive pressure chamber 110. On the remaining two sides of positive pressure chamber 110 of this embodiment are the transmission window 140 at one side/end and, on the side/end opposite the transmission window is the exit aperture 160.

The positive pressure chamber 110 may be designed based on the environment in which the directed energy device 150 is operating. If the positive pressure chamber 110 is required to be large to accommodate a large transmission window 140—and therefore, of large volume—with larger particulates, more louvers would enable more efficient particulate ejection. Generally, the number of louvers and the location of the louvers may vary. For example, some designs may have one louver at the top, while other designs may have louvers all the way down the side of the cylinder depicted in FIG. 2.

Still referring to the embodiment of the system 100 depicted in FIG. 2, after gas enters positive pressure chamber 110 from gas source 120, the gas stream may be received at a series of fins 176, 177, 178, 179. As a result, the gas stream is manipulated or stirred in order to create a turbulent gas flow, thus increasing the flow rate of the gas received into the positive pressure chamber 110. The fins 176, 177, 178, 179 are disposed on the interior wall of the positive pressure chamber 110. The number of fins may be greater in order to further increase turbulence or smaller where lesser turbulence is desired. Creating a turbulent flow increases the probability of particulates being trapped in the gas flow out of the exit aperture 160 and louvers 171, 172, 173, 174. If any particulates are getting down towards the bottom of positive pressure chamber 110, it may take a fair amount of gas to push the particulates out and capture the particulates into the flow of the gas. Accordingly, it may be desirable to have the gas come into the positive pressure chamber 110 with sufficient pressure that the louvers 171, 172, 173, 174 are pushed open and the particulates are forced out. The gas agitation created by fins 176, 177, 178, 179 may also come in handy if a particulate has somehow entered the positive pressure chamber 110 that is not airborne. The stirring action may enable the particulate to be picked up again and moved out of the positive pressure chamber 110 via louvers 171, 172, 173, 174.

Still referring to the embodiment of the system 100 depicted in FIG. 2, a particulate collector and gas recycle device 180 may permit or aid in the collection of particulates from the gas that exits louvers 171, 172, 173, 174. The particulate collector and gas recycle device 180 may also permit or aid in the recycling of the gas. Before ejected particulates and gas are transported to the particulate collector and gas recycle device 180, they may be contained within enclosures 193, 195. Enclosures 193, 195 may be one or more cylinders or sleeves connected to the positive pressure chamber 110 so that the enclosures 193, 195 receive the ejected particulates and gas after they pass through louvers 171, 172, 173, 174. Particulate collector and gas recycle device 180 may take on any number of suitable forms. Particulate collector and gas recycle device 180 may simply include a receptacle. It may also include a filter with a purge valve to remove the particulates from the gas flow out of the positive pressure chamber 110. A return hose 196 relays the recycled gas to the gas source 120.

The particulate collector and gas recycle device 180 may be as simple as an "S" curve in a pipe having an opening to blow out the particulates. The particulate collector and gas recycle device 180 may recycle the gas that has exited the positive pressure chamber 110. The particulate collector and gas recycle device 180 may operate at a negative pressure when compared to the positive pressure chamber 110 and or atmospheric pressure outside the positive pressure chamber 110 in order to enable gas flow out of the cylinder. Particulate collector and gas recycle device 180 may include a filter (not shown in FIG. 2) that is designed to capture particulates that enter the particulate collector and gas recycle device 180.

Hoses 190, 191, or other suitable conduits or transportation media, connect gas source 120 to positive pressure chamber 110, and provide a means to inject pressurized gas into chamber 110. Hoses 192, 194 connect the ejected particulates and exiting gas from the positive pressure chamber 110 and provide them to the negative pressure particulate collector and gas recycle device 180.

Figure 3:
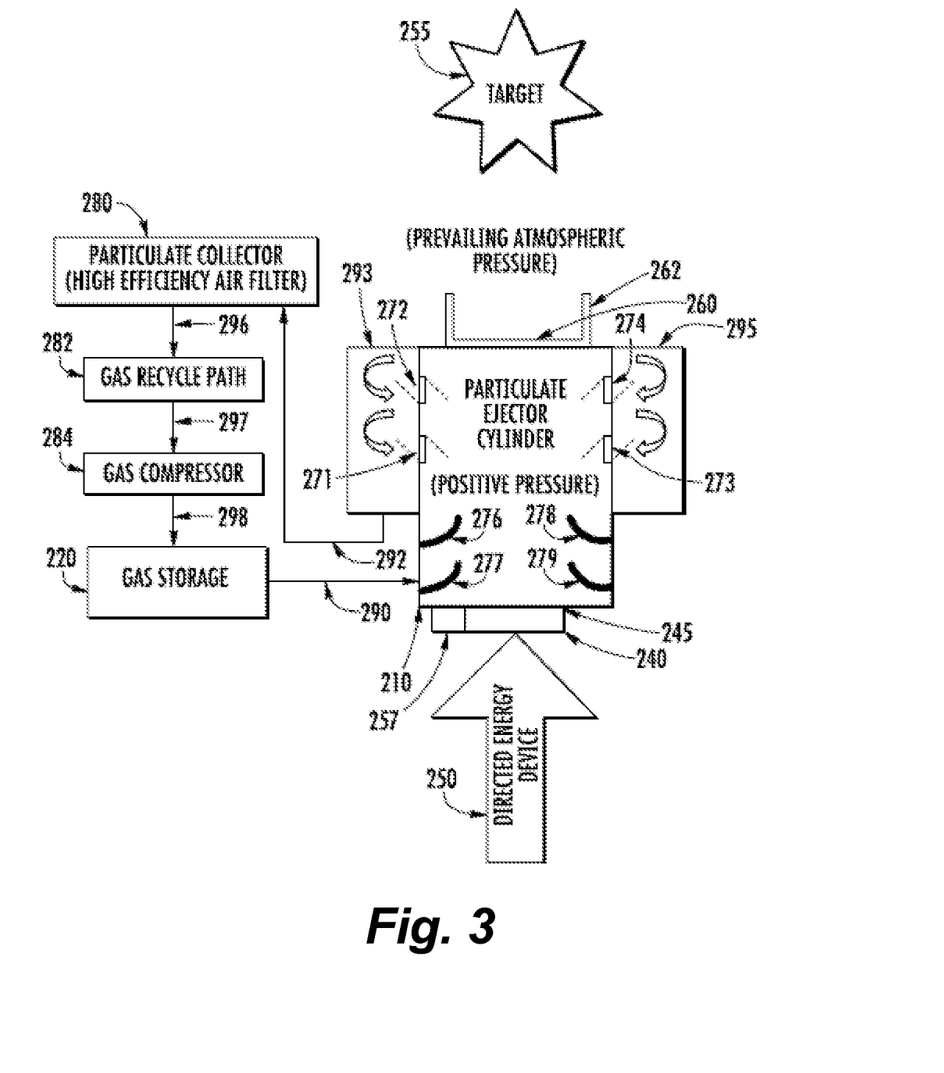
FIG. 3 is an illustration of a system for directed energy transmission window cleanliness, in accordance with another embodiment of the present disclosure.

The system and method disclosed herein may be modified to include a high pressure air compressor with a high efficiency filter. This embodiment may be suitable for a number of applications including optical lens applications in high particulate environments. FIG. 3 is an illustration of a system for directed energy transmission window cleanliness, in accordance with another embodiment of the present disclosure. In the example shown in FIG. 3, a high pressure air compressor is shown in conjunction with a high efficiency filter.

FIG. 3 incorporates a positive pressure chamber 210 into which a gas source 220 may be received in order to maintain cleanliness of the transmission window 240. The gas source 220 may be constant, and may provide gas flow into the positive pressure chamber 210 when the device is in use. Disconnect devices 245, which may be quick disconnect devices, may be disposed between the transmission window 240 and positive pressure chamber 210 in order to permit access to the transmission window 240 and also to permit cleaning of the positive pressure chamber 210. Directed energy may be transmitted through the transmission window 240 by a directed energy device 250 to target 255.

The positive pressure chamber 210 is an airtight cylinder that is interlocked with the directed energy firing signal. The interlock system 257—in this case, software—determines or senses when the directed energy device 250 is firing or engaged. This interlocking action triggers opening of exit aperture 260, and an increase in air flow/pressure within the positive pressure chamber 210 so that there is positive pressure within the positive pressure chamber 210. Doors 262 at exit aperture 260 may open when the directed energy device 250 is fired. Doors 262 may close when the directed energy device 250 is not firing.

When gas flows into the positive pressure chamber 210, fins 276, 277, 278, 279 may stir the gas in order to manipulate the air stream and create a more turbulent flow. Particulate collector and gas recycle device 280 is a high efficiency air filter that may prevent or reduce the collection of particulates on the transmission window 240 when the directed energy device 250 is firing. The filter comprising particulate collector/recycle device 280 could be located close or far away from the directed energy device 250 and positive pressure chamber 210, ideally set outside the positive pressure chamber 210 in an area with easy access to change the filter when "full" with particulates. Before ejected particulates and gas are transported to the particulate collector and gas recycle device 280, they may be contained within enclosures 293, 295. Enclosures 293, 295 may be one or more cylinders or sleeves connected to the positive pressure chamber 210 so that the enclosures 293, 295 receive the ejected particulates and gas after they pass through louvers 271, 272, 273, 274. After the particulates are collected by particulate collector and gas recycle device 280, the gas flows to gas recycle path 282, then to gas compressor 284 and back to gas source 220 for re-use.

Hoses or other conduits used to facilitate gas/particulate flow are hoses 290, 292, 296, 297 and 298. Hose 290 facilitates gas flow into the positive pressure chamber 210. Hose 292 facilitates flow having ejected particulates from the positive pressure chamber 210. Gas intended for recycling may flow from particulate collector and gas recycle device 280 to gas recycle path 282 via hose 296. Gas recycle path 282 may include any number of conduits leading from the particulate collector to the gas compressor 284. Gas may flow from recycle path to gas compressor 284 via hose 297. Gas may flow back into storage from gas compressor 284 via hose 298.

Figure 4:
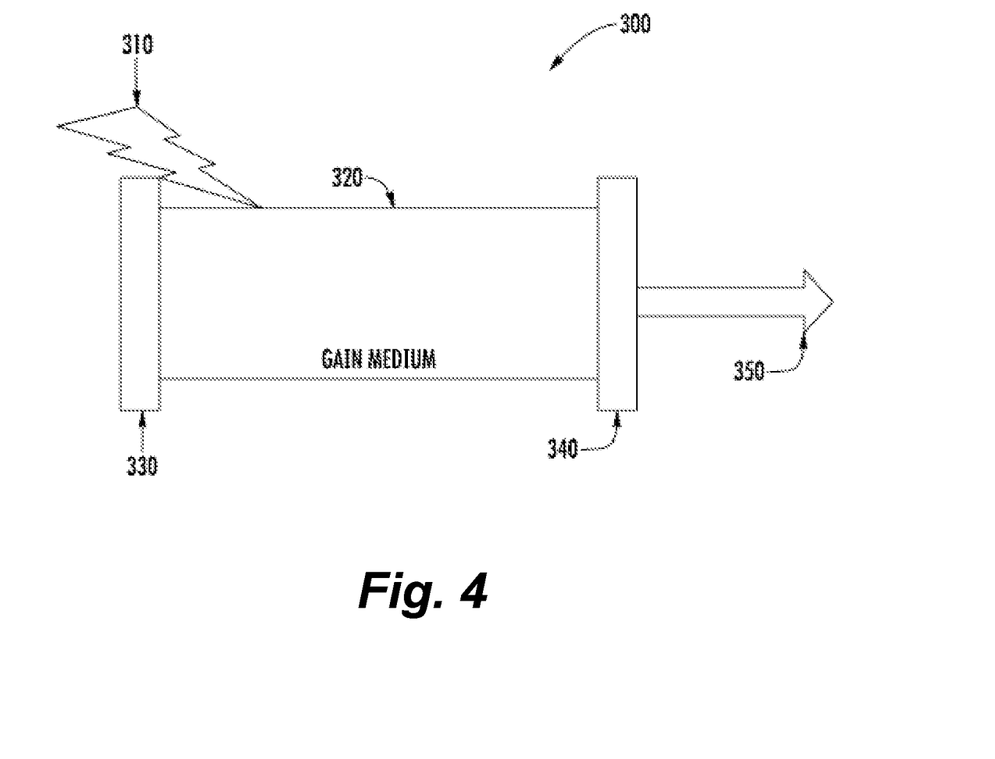
FIG. 4 is a schematic of an example of a directed energy device that may be used with the present system and method in accordance with one embodiment of the present disclosure.

The present system and method may be used with a number of suitable directed energy devices. FIG. 4 is a schematic of an example of a directed energy device that may be used with the present system and method in accordance with one embodiment of the present disclosure. Here, directed energy device 300 is a laser that amplifies radiation in various regions of the electromagnetic spectrum (infrared, visible, etc.) through the pumping of energy (electrical or light). Pumping energy 310 may be received into a gain medium 320, where the pumping energy 310 is amplified and reflected by a reflector 330 out a transmission window 340. Thereafter, the emitted light 350 from the directed energy device 300 is transmitted through the positive pressure chamber of the present disclosure to the target.

Figure 5:
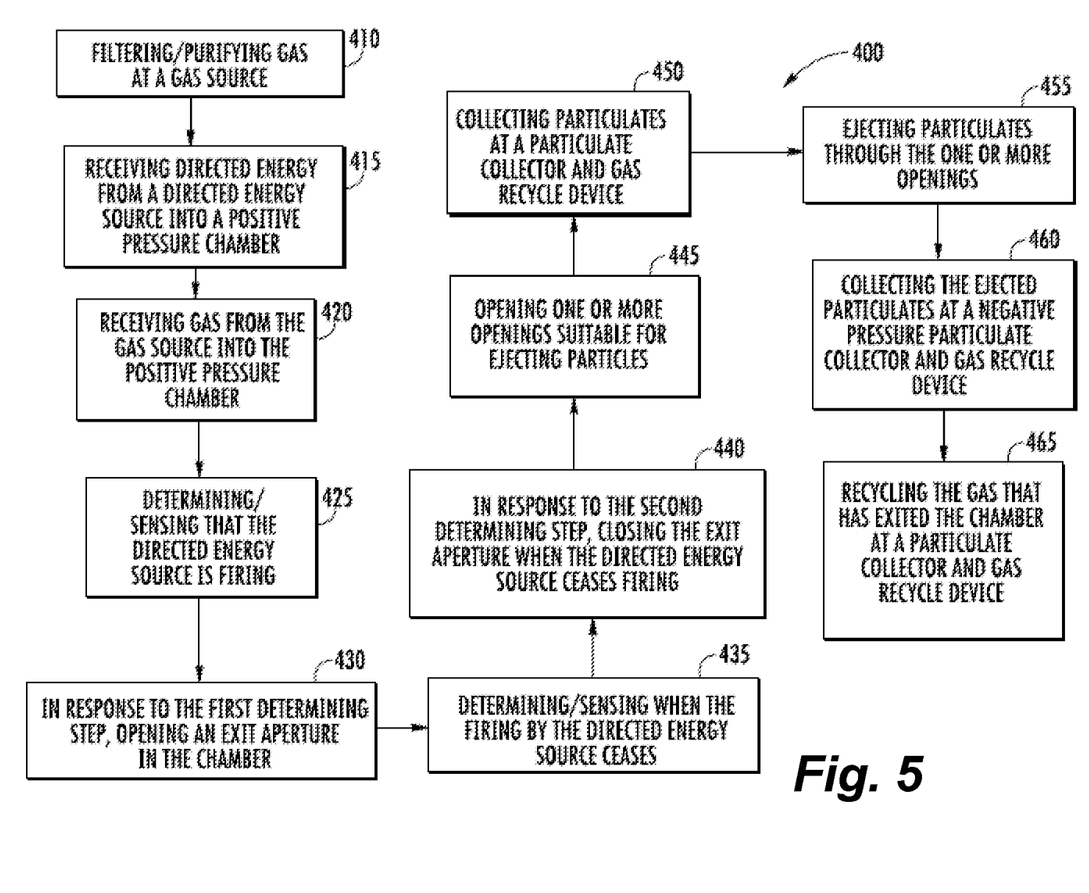
FIG. 5 is a flow chart for a method for transmission window cleanliness for directed energy devices in accordance with one embodiment of the present disclosure.

FIG. 5 is a flow chart 400 for a method for transmission window cleanliness for directed energy devices in accordance with one embodiment of the present disclosure. At step 410, gas is purified or filtered at a gas source. At step 415, the method includes receiving directed energy from a directed energy device to a positive pressure chamber. At step 420, the method includes receiving gas from a gas source into a positive pressure chamber. At step 425, the method includes determining or sensing that the directed energy device is firing. The determining step may be performed by one or more suitable software, electrical or mechanical means. At step 430, in response to the first determining step, the method includes opening an exit aperture in the chamber. Another response to the determining step may be to trigger an increase in air flow in the positive pressure chamber in order to maintain positive pressure. At step 435, the method includes determining or sensing when the firing by the directed energy device ceases. At step 440, in response to the second determining step, the method includes closing the exit aperture when the directed energy source ceases firing. At step 445, the method includes opening one or more openings suitable for ejecting particulates. At step 450, the method includes collecting particulates at a particulate collector and gas recycle device. At step 455, the method includes ejecting particulates through the one or more openings. At step 460, the method includes collecting the ejected particulates at a particulate collector and gas recycle device, which may operate at a negative pressure when compared to an atmospheric pressure outside the positive pressure chamber. At step 460, the method could also include separating the ejected particulates from gas. At step 465, the method includes recycling the gas that has exited the chamber at a particulate collector and gas recycle device.

The present system and method may be used in connection with surgical applications and military applications, among others. The system and method may need to be scaled smaller for surgical applications when compared to military applications since a greater amount of directed energy may be used in military applications. The present system and method may be adapted for use with cancer treatments that involve directed energies. The present system and method may also be adapted for use with dental procedures. Radiation sources, such as X-rays, may be directed through transmission windows. Dentists often use X-rays to take pictures of patients' teeth.

It will be understood that many additional changes in the details, materials, steps and arrangement of parts, which have been herein described and illustrated to explain the nature of the method, may be made by those skilled in the art within the principle and scope of the invention as expressed in the appended claims.

We claim:

1. A system for transmission window cleanliness for use with free-space directed energy devices, comprising:
   a positive pressure chamber mounted to a transmission window of the directed energy device such that the transmission window forms a wall of the positive pressure chamber;
   a gas source configured to provide gas to the positive pressure chamber, wherein the positive pressure chamber is configured to contain the gas at a higher pressure than atmospheric gases outside the positive pressure chamber;
   a closeable exit aperture disposed in a wall of the positive pressure chamber at substantially an opposite end of the positive pressure chamber from the transmission window such that free-space directed energy entering the positive pressure chamber through the transmission window exits the positive pressure chamber through the exit aperture, and wherein the closeable exit aperture is interlocked with the directed energy device such that gas in the positive pressure chamber is allowed to exit the positive pressure chamber when the directed energy device is being fired;
   a particulate collector and gas recycle device, wherein the particulate collector and gas recycle device is configured to receive gas from the positive pressure chamber via a first conduit and is further configured to filter particulates out of the gas before the gas is reintroduced to the positive pressure chamber via a second conduit;
   a set of louvers disposed in one or more openings disposed in one or more walls of the positive pressure chamber, wherein each louver is capable of creating an airtight seal when closed; and
   one or more enclosures disposed between the first conduit and the one or more openings so as to receive gas and particulates exiting from the positive pressure chamber through the one or more openings when the louvers are open.

2. The system of claim 1, wherein the gas source is interlocked with the directed energy device such that when the directed energy device is being fired, the gas source provides an increase in air flow from the gas source into the positive pressure chamber in order to maintain positive pressure within the positive pressure chamber in relation to the atmospheric pressure outside the positive pressure chamber.

3. The system of claim 1, further comprising a turbulence generator disposed within the positive pressure chamber, the turbulence generator being configured to agitate the gas as the gas enters the positive pressure chamber from the second conduit.

4. The system of claim 3, wherein the turbulence generator includes a fin that is disposed on an interior wall of the positive pressure chamber.

5. The system of claim 1, wherein the gas is transparent to a wavelength of the directed energy from the directed energy device.

6. The system of claim 1, wherein the gas is filtered or purified.

7. The system of claim 1, wherein the exit aperture and the set of louvers are configured to open when the directed energy device is being fired and to close when the directed energy device is not being fired.

8. A system for transmission window cleanliness for use with free-space directed energy devices, comprising:
   a positive pressure chamber mounted to a transmission window of the directed energy device such that the transmission window forms a wall of the positive pressure chamber;
   a gas source configured to provide compressed gas to the positive pressure chamber, wherein the positive pressure chamber is configured to contain the gas at a higher pressure than atmospheric gases outside the positive pressure chamber; and
   an exit aperture disposed in an opposite wall of the positive pressure chamber from the transmission window and configured to open only when the directed energy device is firing such that when the exit aperture is open the compressed gas and free-space directed energy exit the positive pressure chamber through the exit aperture;
   a turbulence generator disposed within the positive pressure chamber, the turbulence generator being configured to agitate the compressed gas as the compressed gas enters the positive pressure chamber from the gas source; and
   a set of louvers disposed in one or more openings disposed in one or more walls of the positive pressure chamber, wherein each louver is capable of creating an airtight seal when closed, and wherein each louver is configured to allow the compressed gas to escape the positive pressure chamber when opened.

9. The system of claim 8, wherein the positive pressure chamber configured to be airtight when the exit aperture is closed.

\* \* \* \* \*